(12) United States Patent
Tanaka

(10) Patent No.: US 8,665,477 B2
(45) Date of Patent: Mar. 4, 2014

(54) PRINT SYSTEM, PRINTING APPARATUS, AND COMPUTER PROGRAM PRODUCT

(75) Inventor: Tsuyoshi Tanaka, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 120 days.

(21) Appl. No.: 13/311,930

(22) Filed: Dec. 6, 2011

(65) Prior Publication Data

US 2012/0147421 A1 Jun. 14, 2012

(30) Foreign Application Priority Data

Dec. 10, 2010 (JP) ................................ 2010-275712

(51) Int. Cl.
*G06F 15/00* (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS 5,230,628 A 7/1993 Kaneko et al.
2004/0246515 A1* 12/2004 Patton et al. ................. 358/1.15

FOREIGN PATENT DOCUMENTS

JP 2005-115559 4/2005
JP 2005-267002 9/2005

* cited by examiner

*Primary Examiner* — Saeid Ebrahimi Dehkordy
(74) *Attorney, Agent, or Firm* — Oblon, Spivak, McClelland, Maier & Neustadt, L.L.P.

(57) ABSTRACT

In a print system, print data and print setting information are transmitted from a terminal to a printing apparatus via an email, and the printing apparatus performs a printing process of the print data based on the print setting information. The printing apparatus includes: a first receiving unit that receives a print request email from the terminal; a transmission unit that transmits, to the terminal, a reply email that includes allowable print setting information representing information on designable print settings; and a second receiving unit that receives a second reply email having been transmitted from the terminal and including print setting information designated from among the allowable print setting information.

13 Claims, 10 Drawing Sheets

FIG.5

```
Message-ID: 20100830122158a.msvr@xxx.example.com
Subject: PRINT REQUEST
From: user777@xxx.example.com
To: printer1@printer.example.com
Date: Mon, 30 Aug 2010 12:21:58 +0900
```

FIG.6

| TRANSMISSION DATE AND TIME OF PRINT REQUEST MAIL | MAIL ADDRESS OF PRINT REQUESTING USER | Message-ID OF REPLY EMAIL | NAME OF FILE TO BE PRINTED |
|---|---|---|---|
| 20100829121940 | admin@xxx.example.com | 20100829121956a.msvr@xxx.example.com | XXX.PDF |
| 20100830122158 | user777@xxx.example.com | 20100830122203a.msvr@xxx.example.com | ABC.PDF |
| 20100830122316 | user123@xxx.example.com | 20100830122323a.msvr@xxx.example.com | ZZZ.PDF |

FIG.7

Message-ID: 20100830122203a.msvr@xxx.example.com
References: <20100830122158a.msvr@xxx.example.com>
Subject: Re: PRINT REQUEST
From: printer1@printer.example.com
To: user777@xxx.example.com
Date: Mon, 30 Aug 2010 12:22:03 +0900

FIG.8

```
>>>#! Start
NUMBER OF COPIES:      1
DOCUMENT ORIENTATION:  VERTICAL/HORIZONTAL
COLOR/MONOCHROME:      AUTO/COLOR/MONOCHROME
PRINTING METHOD:       NORMAL/CONFIDENTIAL/RESERVE
SHEET SIZE:            ORIGINAL DOCUMENT SIZE/A3/A4/A5/A6/B4/B5/B6
AGGREGATION:           NO/2in1/4in1
DUPLEX BINDING:        NO/LEFT OPEN/RIGHT OPEN/TOP OPEN/BINDING
STAPLING:              NO/TOP LEFT/TOP RIGHT
PUNCHING:              NO/LEFT/RIGHT/TOP
SORTING:               NO/YES
<<<#! End
```

FIG.9

| | | | | | | | |
|---|---|---|---|---|---|---|---|
| NUMBER OF COPIES: | <numeric> | | | | | | |
| DOCUMENT ORIENTATION: | VERTICAL | HORIZONTAL | | | | | |
| COLOR/ MONOCHROME: | AUTO | COLOR | MONOCHROME | | | | |
| PRINTING METHOD: | NORMAL | CONFIDENTIAL | RESERVE | | | | |
| SHEET SIZE: | ORIGINAL DOCUMENT SIZE | A3 | A4 | A5 | A6 | B4 | B5 | B6 |
| AGGREGATION: | NO | 2in1 | 4in1 | | | | |
| DUPLEX BINDING: | NO | LEFT OPEN | RIGHT OPEN | TOP OPEN | BINDING | | |
| STAPLING: | NO | TOP LEFT | TOP RIGHT | | | | |
| PUNCHING: | NO | LEFT | RIGHT | TOP | | | |
| SORTING: | NO | YES | | | | | |

FIG.10

Message-ID: 20100830122312a.msvr@xxx.example.com
References: <20100830122158a.msvr@xxx.example.com>,
<20100830122218a.msvr@xxx.example.com>
Subject: Re2: PRINT REQUEST
From: user777@xxx.example.com
To: printer1@printer.example.com
Date: Mon, 30 Aug 2010 12:23:12 +0900

FIG.11

```
| >>>#! Start
| NUMBER OF COPIES:      1
| DOCUMENT ORIENTATION:  HORIZONTAL
| COLOR/MONOCHROME:      MONOCHROME
| PRINTING METHOD:       NORMAL/CONFIDENTIAL/RESERVE
| SHEET SIZE:            A3/A4/A5/A6/B4/B5/B6
| AGGREGATION:           NO/2in1/4in1
| DUPLEX BINDING:        NO/LEFT OPEN/RIGHT OPEN/TOP OPEN/BINDING
| <<<#! End
```

FIG.12

```
>>>#! Start
NUMBER OF COPIES:      1
DOCUMENT ORIENTATION:  VERTICAL/HORIZONTAL
COLOR/MONOCHROME:      AUTO/COLOR/MONOCHROME
PRINTING METHOD:       NORMAL/CONFIDENTIAL/RESERVE
SHEET SIZE:            ORIGINAL DOCUMENT SIZE/A3/A4/A5/A6/B4/B5/B6
AGGREGATION:           NO/2in1/4in1
DUPLEX BINDING:        NO/LEFT OPEN/RIGHT OPEN/TOP OPEN/BINDING
STAPLING:              NO/TOP LEFT/TOP RIGHT
PUNCHING:              NO/LEFT/RIGHT/TOP
SORTING:               NO/YES
TONER SAVE:            YES
<<<#! End
```

FIG.13

```
>>>#! Start
NUMBER OF COPIES:      1
DOCUMENT ORIENTATION:  HORIZONTAL
COLOR/MONOCHROME:      MONOCHROME
PRINTING METHOD:       NORMAL/CONFIDENTIAL/RESERVE
SHEET SIZE:            A3/A4/A5/A6/B4/B5/B6
AGGREGATION:           NO/2in1/4in1
DUPLEX BINDING:        NO/LEFT OPEN/RIGHT OPEN/TOP OPEN/BINDING
STAPLING:              NO/TOP LEFT/TOP RIGHT
PUNCHING:              NO/LEFT/RIGHT/TOP
SORTING:               NO/YES
STAPLING:              YES
<<<#! End
```

PRINT SYSTEM, PRINTING APPARATUS, AND COMPUTER PROGRAM PRODUCT

CROSS-REFERENCE TO RELATED APPLICATIONS

The present application claims priority to and incorporates by reference the entire contents of Japanese Patent Application No. 2010-275712 filed in Japan on Dec. 10, 2010.

BACKGROUND OF THE INVENTION

1. Field of the Invention

The present invention relates to a print system, a printing apparatus, and a computer program product.

2. Description of the Related Art

In recent years, among print systems based on a general-purpose operating system such as Windows (registered trademark) or Unix (registered trademark), many offices and households are using a print system into which printer drivers prepared for respective printing apparatuses and printer emulations are introduced.

On the other hand, there is an increasing diversity of mobile terminals, such as mobile phones, on which operating systems specific to manufacturers or models are installed. As performance of mobile terminals is improved, the need for printing from the mobile terminals has also increased. However, in the present situation it is difficult to provide print systems or printer drivers compatible with the diversity of individual mobile terminals. Thus, a method of providing a printing service using an email system that is a relatively shared infrastructure has been used widely.

Problems with the printing service through the email system are to obtain information on the print settings provided by a printing apparatus to be used and how to designate the desired print settings, based on the information, from a mobile terminal. As a print system which can solve these problems, Japanese Patent Application Laid-open No. 2005-115559 discloses a print system in which a plurality of email addresses are assigned to a printing apparatus such that the different email addresses are associated with the different print settings. When using the print system, a user sends an email, attached to print data (data to be printed), to one of the email addresses that correspond to the desired print setting from a mobile terminal, so that the user can print the print data with desired print settings.

However, in this print system, a large number of email addresses are needed when there are diverse print settings and options. Suppose, for example, that a combination of the print settings can be chosen from the following print settings: two settings for document orientation, three settings for colors and monochrome, three settings for printing methods, eight settings for sheet sizes, three settings for aggregation, five settings for duplex binding, three settings for stapling, three settings for punching, and two settings for sorting; 38880 (=2×3×3×8×3×5×3×3×2) email addresses are required.

If the printing apparatus is used on a daily basis by limited users, preparing or storing only a limited number of email addresses corresponding to combinations of frequently used print settings may be a practicable solution. However, many of the printing needs from mobile terminals involve using printing apparatuses which are not routinely used, for example, a printing apparatus used for a business purpose that is installed in the office of a visiting site or outside the office or a printing apparatus used for a private purpose that is installed in a convenience store.

That is, in this print system, the user needs to know in advance what kind of print settings the printing apparatus, that is to be used, has. Moreover, the user needs to prepare or to know an email address corresponding to the combination of print settings which the user wants to use, or to select an email address from a massive list of email addresses corresponding to combinations of print settings. However, it is very difficult to accomplish such an operation.

SUMMARY OF THE INVENTION

It is an object of the present invention to at least partially solve the problems in the conventional technology.

In a print system, print data and print setting information are transmitted from a terminal to a printing apparatus via an email, and the printing apparatus performs a printing process of the print data based on the print setting information. The printing apparatus includes: a first receiving unit that receives a print request email from the terminal; a transmission unit that transmits, to the terminal, a reply email that includes allowable print setting information representing information on designable print settings; and a second receiving unit that receives a second reply email having been transmitted from the terminal and including print setting information designated from among the allowable print setting information.

A printing apparatus receives print data and print setting information transmitted via an email from a terminal and performs a printing process of the print data based on the print setting information. The printing apparatus includes: a first receiving unit that receives a print request email from the terminal; a transmission unit that transmits, to the terminal, a reply email that includes allowable print setting information representing information on designable print settings; and a second receiving unit that receives a second reply email having been transmitted from the terminal and including print setting information designated from the allowable print setting information.

A computer program product that includes a non-transitory computer-usable medium having a computer-readable program code embodied in the medium causes a computer to instruct a printing apparatus that receives print data and print setting information transmitted via an email from a terminal and that performs a printing process of the print data based on the print setting information to function as: a first receiving unit that receives a print request email from the terminal; a transmission unit that transmits a reply email that includes allowable print setting information representing information on designable print settings to the terminal; and a second receiving unit that receives a second reply email having been transmitted from the terminal and including print setting information designated from the allowable print setting information.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating an example of an email header of a sending email in the print system according to the embodiment;

FIG. 6 is a diagram illustrating an example of a print request list in the print system according to the embodiment;

FIG. 7 is a diagram illustrating an example of the header of a reply email in the print system according to the embodiment;

FIG. 8 is a diagram illustrating an example of the main body of the reply email in the print system according to the embodiment;

FIG. 9 is a diagram illustrating an example of a table of print setting keywords in the print system according to the embodiment;

FIG. 10 is a diagram illustrating an example of the header of a second reply email in the print system according to the embodiment;

FIG. 11 is a diagram illustrating an example of the main body of the second reply email in the print system according to the embodiment;

FIG. 12 is a diagram illustrating another example of the main body of the second reply email in the print system according to the embodiment; and FIG. 13 is a diagram illustrating another example of the main body of a reply email in the print system according to the embodiment.

DETAILED DESCRIPTION OF THE PREFERRED EMBODIMENTS

Hereinafter, an embodiment of the present invention will be described with reference to the drawings.

Configuration of Print System

Figure 1:
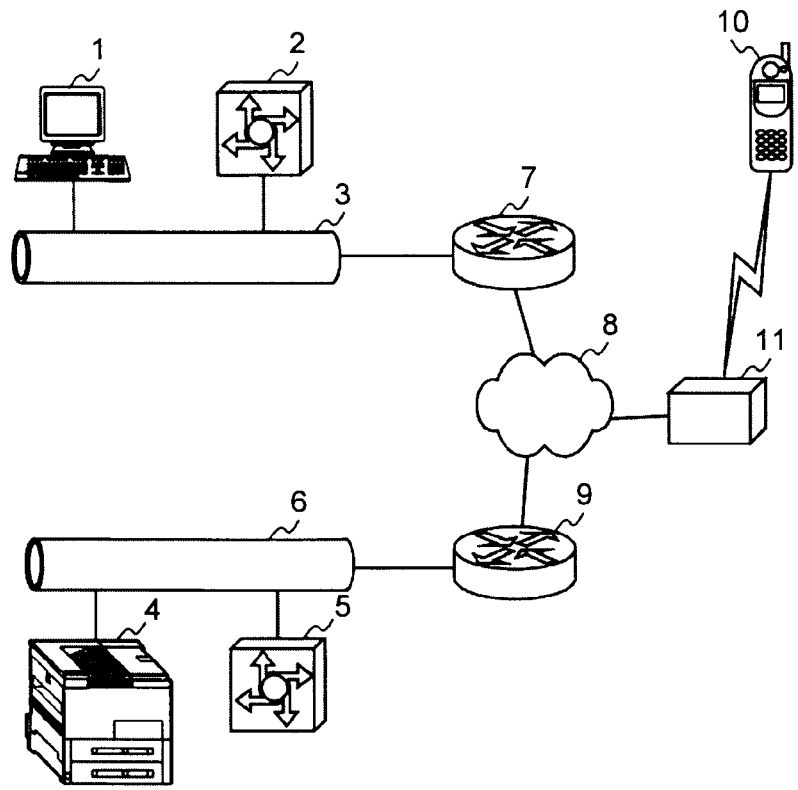
FIG. 1 is a diagram illustrating an environment for using a print system according to an embodiment.

FIG. 1 is a diagram illustrating the environment for using a print system according to an embodiment. The print system is configured such that a first print client 1 formed by a computer device such as a personal computer (PC) and a second print client 10 having the function of a mobile terminal can perform printing using a printing apparatus 4 connected through a network.

The first print client 1 and a first server 2 are connected to a first local area network (LAN) 3, and the first LAN 3 is connected to the Internet 8 through a first router 7. Moreover, the printing apparatus 4 and a second server 5 are connected to a second LAN 6, and the second LAN 6 is connected to the Internet through a second router 9. Furthermore, the second print client 10 is connected to the Internet 8 through a wide area network (WAN) 11. The second LAN 6 is separated from the first LAN 3 by the first and second routers 7 and 9.

The first and second routers 7 and 9 connect LANs belonging to different segments and relay or filter data packets between the LANs. The first server 2 and the second server 5 provides a domain name system (DNS) service, a simple mail transfer protocol (SMTP) service, a post office protocol (POP) service, and the like.

In addition to the above, a plurality of computer devices which can serve as a print client, an image forming device (such as a printer, a copying machine, or a MFP), a server computer device, a relay device for forming a network such as a repeater or a HUB, and the like may be connected to the respective LANs 3 and 6. However, these elements are not illustrated in the drawing.

Block Diagram of Printing Apparatus

Figure 2:
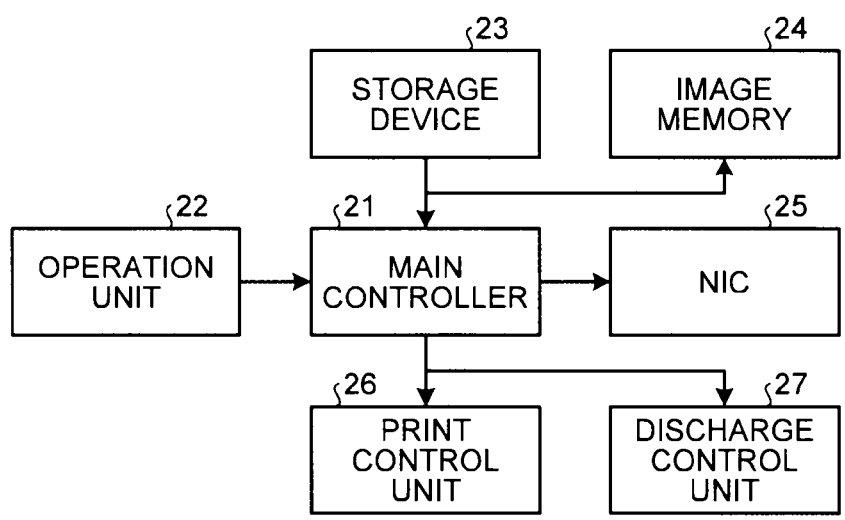
FIG. 2 is a block diagram illustrating the configuration of a control system of a printing apparatus according to the embodiment.

FIG. 2 is a block diagram illustrating the configuration of a control system of the printing apparatus 4 illustrated in FIG. 1. The control system of the printing apparatus 4 includes a main controller 21, an operation unit 22, a storage device 23, an image memory 24, a network interface card (NIC) 25, a print control unit 26, and a discharge control unit 27, each of which is connected to the main controller 21.

The main controller 21 controls an overall operation of the printing apparatus 4. The operation unit 22 is a user interface for allowing an operator to operate the printing apparatus 4. The storage device 23 is formed by a hard disk drive (HDD) or the like, and is used for storing print data and a computer program, or as a cache area for storing data, and the like. Moreover, the storage device 23 also stores a control program (program codes) corresponding to a flowchart described later and email creation software. These computer programs are stored in the storage device 23 by downloading from a network through the NIC 25 or reading from a recording medium such as a CD-ROM (not illustrated).

The image memory 24 is used for expanding or processing a print data image. The NIC 25 monitors communication packets flowing on the second LAN 6 and performs control so as to take in only information associated with the printing apparatus 4 and send packets created by the printing apparatus 4 to the second LAN 6. The print control unit 26 controls a print unit (printer engine) for a printing image on a print sheet. The discharge control unit 27 controls a discharge unit for discharging a print sheet printed by the print unit to the outside of the printing apparatus 4.

Operation of Print System

The first print client 1 and the second client 10 have email creation software (hereinafter, mail software) installed therein and can send image data as print data to the printing apparatus 4 as an attachment file attached to an email. Moreover, in addition to image data, text data, document data, table data, and the like which are to be printed can also be attached to an email.

Figure 3:
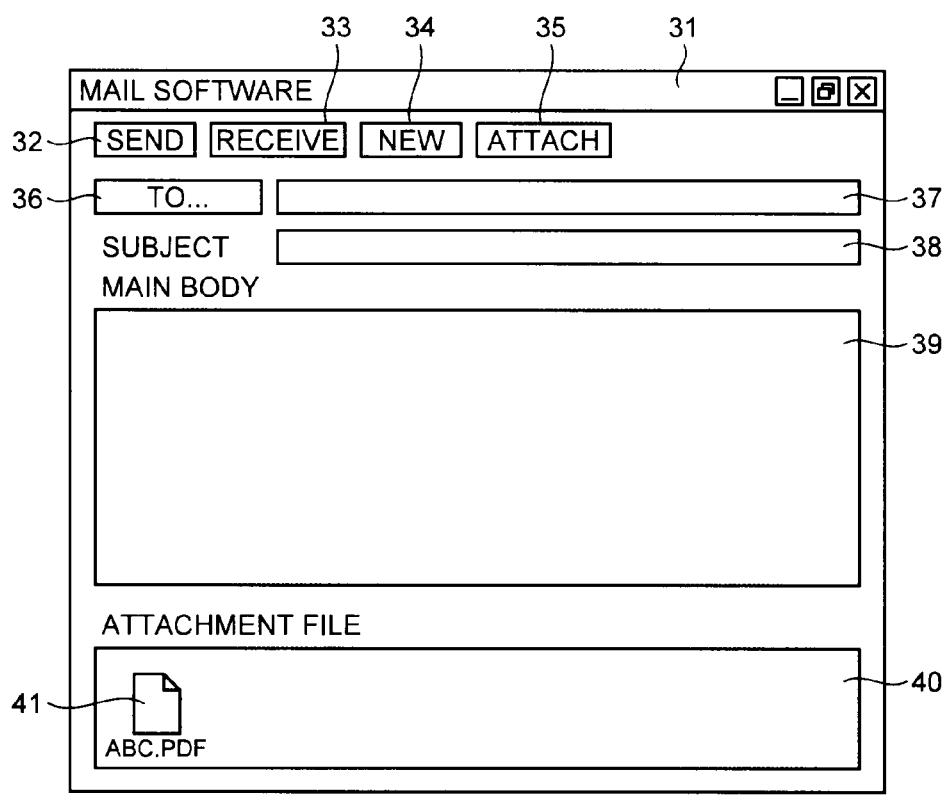
FIG. 3 is a diagram illustrating an example of a screen of a graphical user interface (GUI) of email creation software in the print system according to the embodiment.

FIG. 3 illustrates an example of a GUI screen of mail software. On a window screen 31 of the mail software, a "Send" button 32 for sending an email, a "Receive" button 33 for receiving an email, a "New" button 34 for creating a new email, an "Attach" button 35 for attaching a file including image data or the like to an email, a "To" button 36 for referencing an address book in which the destination of an email is stored, a destination editing box 37 for inputting the destination of an email, a subject editing box 38 for inputting the subject of an email, a text box 39 for inputting a main body of an email, and a window 40 for displaying an attached file graphically are provided. In this example, an icon 41 and the file name of a file attached to an email are displayed in the window 40. The GUI screen of mail software is different from one mail software to another, and mobile terminals have distinctive mail software interfaces.

Figure 4:
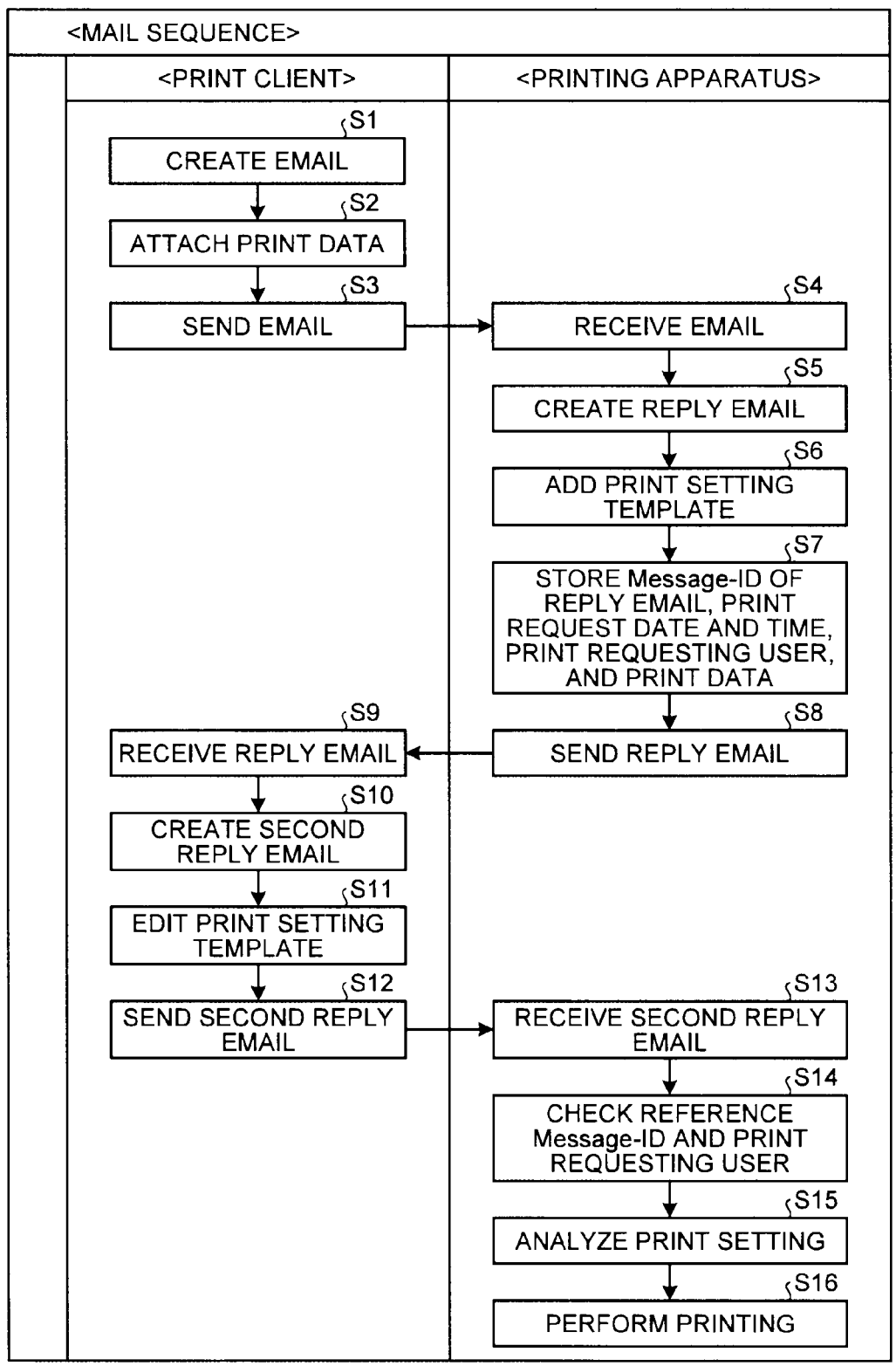
FIG. 4 is a flowchart illustrating the operation of the print system according to the embodiment.

FIG. 4 is a flowchart illustrating the entire flow of the operations of the print system of the present embodiment, which starts when the first print client 1 and the second print client 10 creates a print request email and ends when the printing apparatus 4 performs printing. In this drawing, the process performed by the print client is executed by mail software installed in the print client, and the process performed by the printing apparatus 4 is executed by a print control program stored in the storage device 23 of the printing apparatus 4.

In step S1, a user who wants to print data creates a print request email using the mail software of the first print client 1 or the second print client 10. Subsequently, in step S2, a print file (a file containing print data) prepared in advance is attached to the mail software. Subsequently, in step S3, the email address of the printing apparatus 4 is input to a recipient, and a send button is pressed, whereby an email is sent to the printing apparatus 4 with the print file attached thereto.

FIG. 5 is a diagram illustrating an example of an email header of an email (hereinafter, a sending email) to be sent to the printing apparatus 4 in step S3. As illustrated in the drawing, the email header includes, in the order of appearance from the first line, "Message-ID" which is an ID capable of identifying the email, "Subject" which is the subject (title) of the email, "From" which is an email address of a sender of the email, "To" which is an email address of a recipient of the email, and "Date" which is the date when the email is sent.

Here, "Print Request" and "printer1@printer.example.com" (the email address of the printing apparatus 4) are set to "Subject" and "To" of the email header by the user. When one user sends a number of print request emails, it may be appropriate to set names to the "Subject" field with which the emails can be identified. The email body may be left blank (blank email).

The description returns to FIG. 4. In step S4, the printing apparatus 4 receives the print request email sent in step S3. In step S5, in response to the print request email received in step S4, the printing apparatus 4 creates a reply email to the print request email. In step S6, the printing apparatus 4 adds a print setting template to the main body of the email created in step S5. The print setting template is one that corresponds to allowable print setting information on print settings allowed by the print system of the present embodiment and that is information representing the print settings provided by the printing apparatus 4 and the options of the respective print settings (details thereof will be described later).

In step S7, the email address (print requesting user) of the sender of the print request email and the email sending time (print request time) of the print request email received in step S4 are stored in association with the "Message-ID" of the reply email created in step S5 and the print file received in step S4. An example of stored information is illustrated in FIG. 6. In step S8, the reply email is sent.

FIG. 7 is a diagram illustrating an example of the email header of the reply email sent to the print client from the printing apparatus 4 in step S8. As illustrated in the drawing, the email header of the reply email is the same as the email header of the print request email illustrated in FIG. 5. A "References" tag on the second line illustrates "Message-ID" of an email serving as the original mail of the replay. In this example, the "Message-ID" included in the email header of the print request email illustrated in FIG. 5 is included.

FIG. 8 is a diagram illustrating an example of an email body of the reply email. A print setting template is described between "#!Start" representing the start of a print setting description area and "#!End" representing the end of the print setting description area. The print setting template is information representing a list of print settings which are allowed by the printing apparatus 4. The kinds of print settings which can be designated in relation to a print item are described next to the "xxx:" format. Subsequent to the "xxx:" format, the options which can be designated in relation to the print setting are listed with a slash "/" mark.

In this example, number of copies (set to a default value of 1), options of document orientation (vertical, horizontal), options of color/monochrome (auto, color, monochrome), options of print method (normal, confidential, reserve), options of sheet size (use original document size, A3, A4, A5, A6, B4, B5, B6), options of aggregation (no, 2in1, 4in1), options of duplex binding (no, left open, right open, top open, bind), options of stapling (no, top left, top right), options of punching (no, left, right, top), and options of sorting (no, yes) are set as the list of print settings. The leftmost settings of the options of the respective functions are the default settings.

The print setting template is created based on a table of print setting keywords stored in the storage device 23. FIG. 9 illustrates an example of a table of print setting keywords. The contents of the table of print setting keywords can be changed by the administrator of the printing apparatus 4. In this example, "<numeric>" described in the table corresponding to number of copies implies that an arbitrary natural number can be set in this field where 1 is set as a default value.

The description returns to FIG. 4. In step S9, the print client receives the reply email sent from the printing apparatus 4. In step S10, the print requesting user creates a second reply email to the reply email received in step S9. Most mail software has a function of creating a reply email by quoting the main body of an original mail when creating a reply email. In this example, the second reply email is created using this function. In step S11, the print setting template in the main body of the reply email quoted in the main body of the second reply email created in step S10 is edited to fit the print settings desired by the user. In step S12, the print setting template edited in step S11, namely a second reply email in which the contents of instructions on the print settings are written is sent to the printing apparatus 4.

FIG. 10 is a diagram illustrating an example of the email header of the second reply email sent to the printing apparatus 4 from the print client in step S12. The email header of the second reply email is the same as the email header of the reply email illustrated in FIG. 7.

FIG. 11 is a diagram illustrating an example of the email body of the second reply email. In some mail software, when creating a reply email by quoting the contents of an original mail, a quote mark such as ">" or "|" is added to the beginning of lines of quoted contents. By specifying a print setting description area using tags such as ">>>#! Start" and "<<<#! End" or detecting a print setting keyword from each line, it is possible to detect that the print settings are designated in the lines subsequent to the detected line.

In addition to the blank character, the user can specify desired print settings by deleting characters other than a character string representing designated print settings as in the case of document orientation and color/monochrome settings. Moreover, the user can specify desired print settings by deleting the options other than the desired settings so that the desired print setting becomes the first (leftmost) option as in the case of printing method and sheet size settings. In this case, it is possible to skip the process to delete the subsequent options. Moreover, with this method, the first options of the respective print settings in the template replied by the printing apparatus 4 function as the default settings of the print settings. That is, when printing is performed with the first options of the print setting template replied by the printing apparatus 4, the print client may only need to send a second reply to the printing apparatus without editing the corresponding lines. Moreover, when the user wants to perform printing with the default print settings (the first options) as in the case of stapling, punching, and sorting settings, the same effects are obtained by deleting the lines designating these print settings line by line.

That is, when the print settings in the leftmost options of the respective functions in the print setting template in the reply email body are different from the print settings in the options for the corresponding functions in the print setting information in the second reply email body, it is regarded that the user has designated print settings different from the default settings. When both print settings are identical to each other, that is, when the user has not edited the print setting template, it is regarded that the user has designated the default print settings. Moreover, when the user has deleted all the function names and the options, it is regarded that the default print settings are designated. As for the number of copies, the user can set an arbitrary natural number.

Therefore, in the case of FIG. 11, since the leftmost settings for the options of number of copies, printing method, aggregation, and duplex binding are the same as those of the print setting template in the reply email body as illustrated in FIG. 8, the user has selected the default settings. Moreover, since the user has deleted the lines corresponding to the settings for stapling, punching, and sorting, the default settings ("No" for all settings) are selected for these settings. In contrast, as for the settings for the document orientation, color/monochrome, and sheet size, "Horizontal," "Monochrome," and "A3" are selected, respectively, rather than the default print settings.

The description returns to FIG. 4. In step S13, the printing apparatus 4 receives the second reply email sent in step S12. In step S14, authentication is performed by checking whether the Message-ID stored in step S7 is included in the References tag in the email header of the second reply email received in step S13. When a matched Message-ID is present, it is checked whether the sender address stored in step S7 is identical to the sender address of the email received in step S13. When both addresses are identical to each other, the printing apparatus 4 determines that the email received in step S13 is an email that has designated print settings in relation to a series of print requests received after step S4.

In step S15, the print settings described in the main body of the second reply email received in step S13 are read, and the contents of the instructions on the print settings are analyzed. In step S16, the printing apparatus 4 causes the print unit to print the print file stored in step S7 in accordance with the print settings analyzed in step S15 under the control of the print control unit 26. In this way, the print requesting user can obtain a printed result with desired print settings by operating the print client.

As described in detail above, according to the print system of the embodiment, upon receiving print data attached to an email from a print client, the printing apparatus 4 sends, as a reply email, a print setting template including a list of print settings and options; the print settings can be set by the print client which is a sender of the email, and the options can be selected for the respective print settings. The user of the print client can designate print settings having desired combinations by sending a second reply email that designates desired print settings based on the print setting template to the printing apparatus 4.

Therefore, the user does not need to prepare email addresses corresponding to a combination of print settings or to select an email address, which has been necessary in a print system of the related art. Moreover, the user can designate print settings easily.

The present invention is not limited to the above embodiment, and modifications (1) to (3) can be made, for example.

(1) The email to which print data is attached is changed from the print request email (which is sent in step S3 of FIG. 4) to the second reply email (which is sent in step S12 of FIG. 4). By so doing, the user of the print client can send print data after checking whether print settings are set as desired by looking at the print setting template in the main body of the reply email (which is received in step S9 of FIG. 4).

(2) The correspondence between print setting information and the email address of a print requesting user within a predetermined period in the past may be stored in the printing apparatus 4. When a print request email having print data attached thereto is received from the user within the period, printing is performed using the print settings stored for the user.

(3) A print setting which does not have an option may be prepared in the print setting template, and when the user does not use the function of the print setting, the print setting may be deleted from the print setting template. That is, for example, when a function (in this example, toner save) with no option is present in the print setting template in the reply email body as illustrated in FIG. 12, by deleting the description of toner save as illustrated in FIG. 13, "toner save: no" is set.

According to the present embodiment, when print data and print setting information, transmitted via an email from a terminal, are received and a printing process with respect to the print data, on the basis of the print setting information is performed, a printing apparatus sends an email including information of allowable print settings to the terminal as an reply email to the print request email and receives a second reply email including print setting information which is selected and designated by the user of the terminal from the allowable print setting information.

According to the present embodiment, in a print system in which a terminal sends print data and print setting information to a printing apparatus via an email, and the printing apparatus performs a printing process with the print data on the basis of the print setting information, the user does not need to prepare email addresses corresponding to combinations of print settings or to select an email address, and thus the user can designate print settings easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print system in which print data and print setting information are transmitted from a terminal to a printing apparatus via an email, and the printing apparatus performs a printing process of the print data based on the print setting information, wherein
   the printing apparatus includes:
      a first receiving unit that receives a print request email from the terminal;
      a transmission unit that transmits, to the terminal, a reply email that includes allowable print setting information representing information on designable print settings; and
      a second receiving unit that receives a second reply email having been transmitted from the terminal and including print setting information designated from among the allowable print setting information,
   wherein the allowable print setting information included in the reply email has a structure that is displayed in the terminal as characters in a main body of the reply email, and
   wherein the print setting information included in the second reply email is a character that is left as the character representing desired print settings from among the characters displayed in the main body of the reply email.

2. The print system according to claim 1, wherein
   the printing apparatus includes:
      a storing unit that stores, when print data is attached to the print request email, the print data in a storage device; and a print control unit that performs a printing process of the stored print data based on print setting information included in the second reply email.

3. The print system according to claim 1, wherein the printing apparatus includes a print control unit that performs, when print data is attached to the second reply email, a printing process of the print data attached to the second reply email based on print setting information included in the second reply email.

4. The print system according to claim 1, wherein when the print setting information included in the second reply email is identical to the allowable print setting information included in the reply email, the print control unit performs a printing process with default print settings.

5. The print system according to claim 1, wherein the characters representing the allowable print setting information are displayed by being arranged in an array in a predetermined direction for each function, and a default print setting is provided at an end of the array in the predetermined direction.

6. The print system according to claim 1, wherein the characters representing the allowable print setting information are displayed by being arranged in an array in a predetermined direction for each function, and the print control unit performs, when there is an array, with respect to a function, having been deleted from the allowable print setting information in the print setting information included in the second reply email, a printing process with a default print setting with respect to the function.

7. A printing apparatus that receives print data and print setting information transmitted via an email from a terminal and that performs a printing process of the print data based on the print setting information, the printing apparatus comprising:
a first receiving unit that receives a print request email from the terminal;
a transmission unit that transmits, to the terminal, a reply email that includes allowable print setting information representing information on designable print settings; and
a second receiving unit that receives a second reply email having been transmitted from the terminal and including print setting information designated from the allowable print setting information,
wherein the allowable print setting information included in the reply email has a structure that is displayed in the terminal as characters in a main body of the reply email, and
wherein the characters representing the allowable print setting information are displayed by being arranged in an array in a predetermined direction for each function, and default print settings are provided at an end of the array in the predetermined direction.

8. The printing apparatus according to claim 7, further comprising:

a storing unit that stores, when print data is attached to the print request email, the print data in a storage device; and
a print control unit that performs a printing process of the stored print data based on the print setting information included in the second reply email.

9. The printing apparatus according to claim 7, further comprising:
a print control unit that performs, when print data is attached to the second reply email, a printing process of the print data attached to the second reply email based on print setting information included in the second reply email.

10. The printing apparatus according to claim 7, wherein the print control unit performs, when the print setting information included in the second reply email is identical to the allowable print setting information included in the reply email, a printing process with default print settings.

11. The printing apparatus according to claim 7, wherein the print setting information included in the second reply email is a character that is left as the character representing a desired print setting from among the characters displayed in the main body of the reply email.

12. The printing apparatus according to claim 7, wherein the print control unit performs, when there is an array, with respect to a function, having been deleted from the allowable print setting information in the print setting information included in the second reply email, a printing process with a default print setting with respect to the function.

13. A non-transitory computer program product comprising a non-transitory computer-usable medium having a computer-readable program code embodied in the medium causing a computer to instruct a printing apparatus that receives print data and print setting information transmitted via an email from a terminal and that performs a printing process of the print data based on the print setting information to function as:
a first receiving unit that receives a print request email from the terminal;
a transmission unit that transmits a reply email that includes allowable print setting information representing information on designable print settings to the terminal; and
a second receiving unit that receives a second reply email having been transmitted from the terminal and including print setting information designated from the allowable print setting information,
wherein the allowable print setting information included in the reply email has a structure that is displayed in the terminal as characters in a main body of the reply email, and
wherein the characters representing the allowable print setting information are displayed by being arranged in an array in a predetermined direction for each function, and default print settings are provided at an end of the array in the predetermined direction.

* * * * *